United States Patent [19]

Coleman

[11] Patent Number: 4,793,509

[45] Date of Patent: Dec. 27, 1988

[54] BULK MATERIAL CONTAINER HAVING A FILTER VENT

[75] Inventor: Clarence B. Coleman, San Leandro, Calif.

[73] Assignee: Fabricated Metals, Inc., San Leandro, Calif.

[21] Appl. No.: 155,494

[22] Filed: Feb. 12, 1988

[51] Int. Cl.$^4$ .............................................. B65D 51/16
[52] U.S. Cl. .................................... 220/207; 220/372
[58] Field of Search ........................ 220/207, 371, 372

[56] References Cited

U.S. PATENT DOCUMENTS

| | | | |
|---|---|---|---|
| 1,675,503 | 7/1928 | McCallum | 220/372 |
| 1,815,920 | 7/1931 | Lake | 220/372 |
| 1,921,943 | 8/1933 | Rice et al. | 220/372 |
| 2,371,296 | 3/1945 | Hopwood | 220/371 |
| 2,603,308 | 7/1952 | McCall | 220/372 |
| 2,675,093 | 4/1954 | McCall et al. | 220/371 |
| 4,413,746 | 11/1983 | Matsutani | 220/207 X |

Primary Examiner—Donald F. Norton
Attorney, Agent, or Firm—Jack M. Wiseman

[57] ABSTRACT

A bulk material container with a vent. Disposed in the vent is a filter membrane. Under normal conditions, fluid in the container breathes with the air under atmospheric pressure through the filter membrane. In one embodiment, when the bulk material in the container is under excessive fluid pressure, the filter membrane is fractured for fluid under excessive pressure to vent rapidly to atmosphere. In another embodiment, when there is an excessive vacuum in the container, air under atmospheric pressure fractures the filter member for air atmospheric pressure to instantaneously enter the container through the fractured membrane to reduce the vacuum within the container.

18 Claims, 4 Drawing Sheets

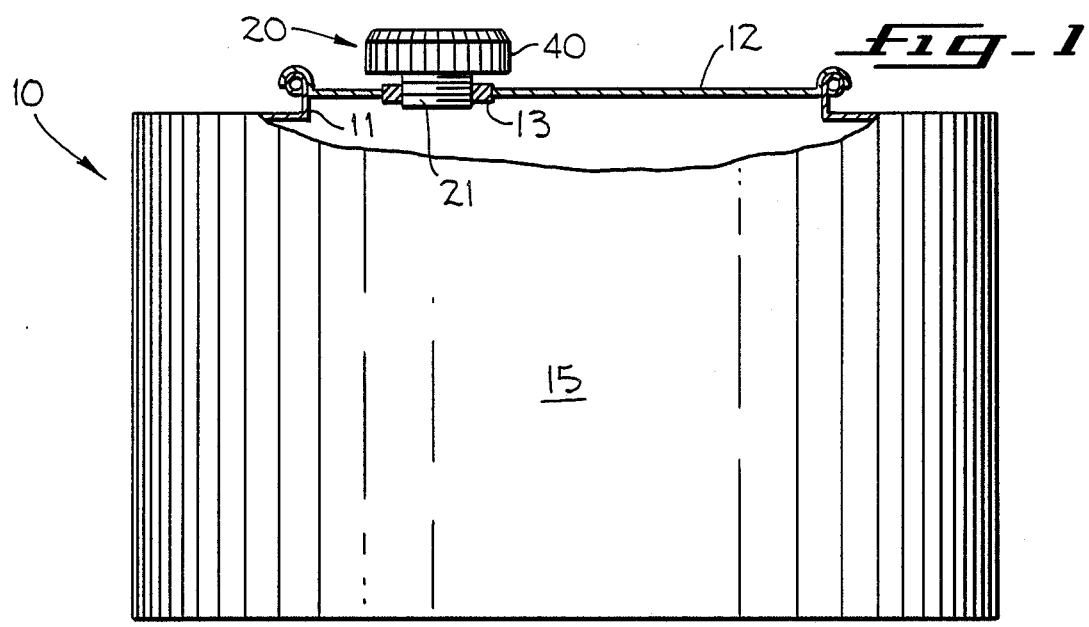
fig_1
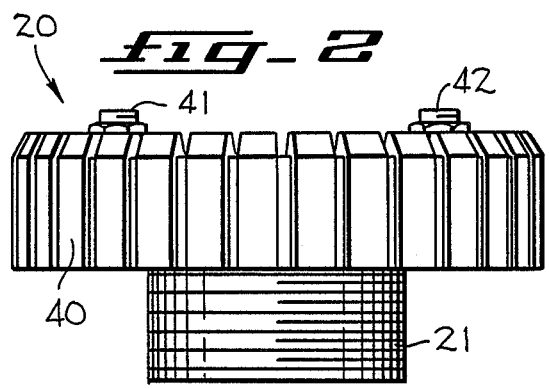
fig_2
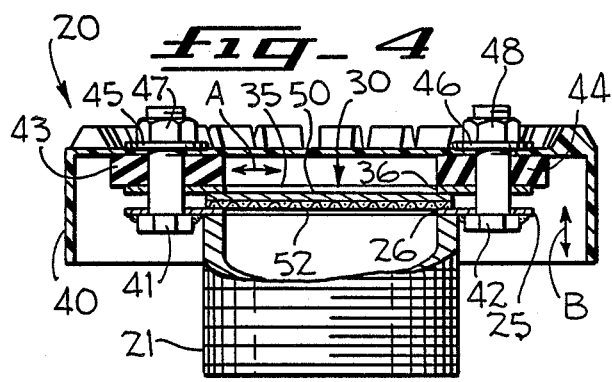
fig_4
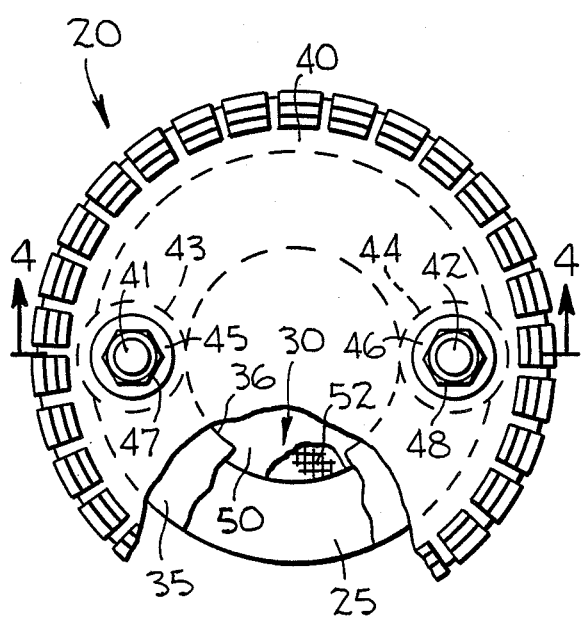
fig_3
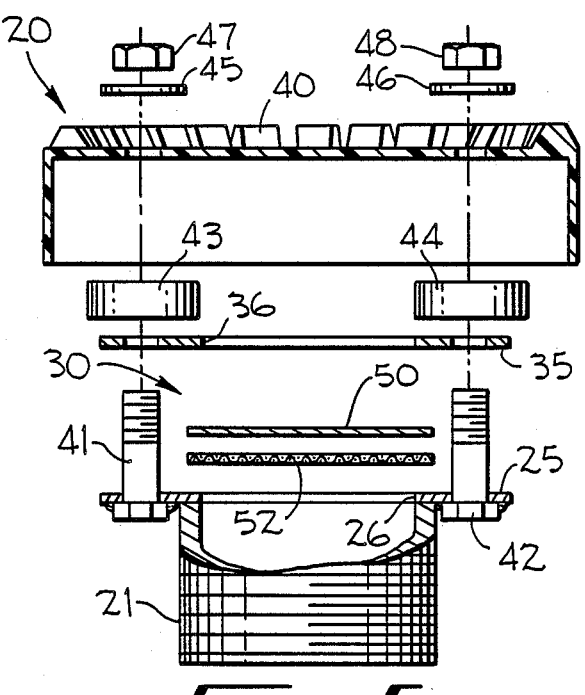
fig_5

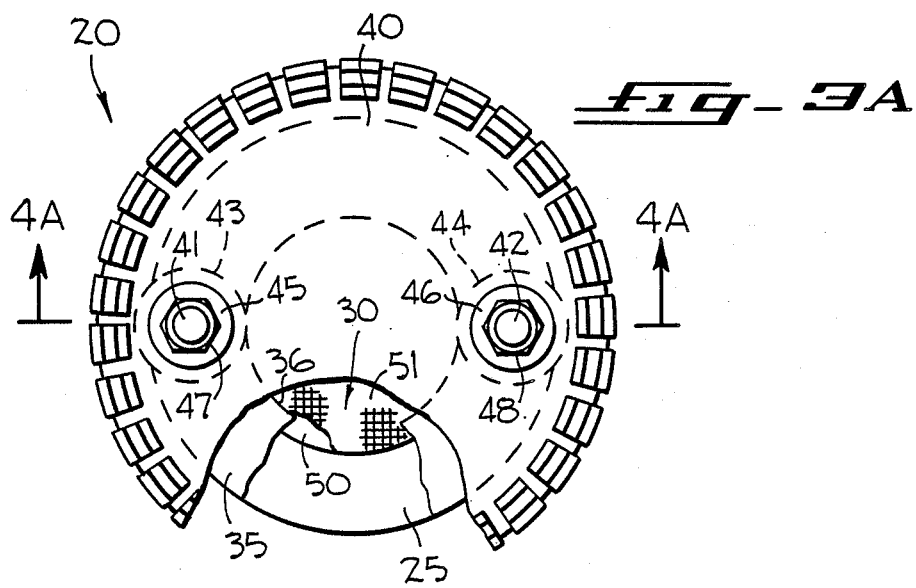
Fig_3A
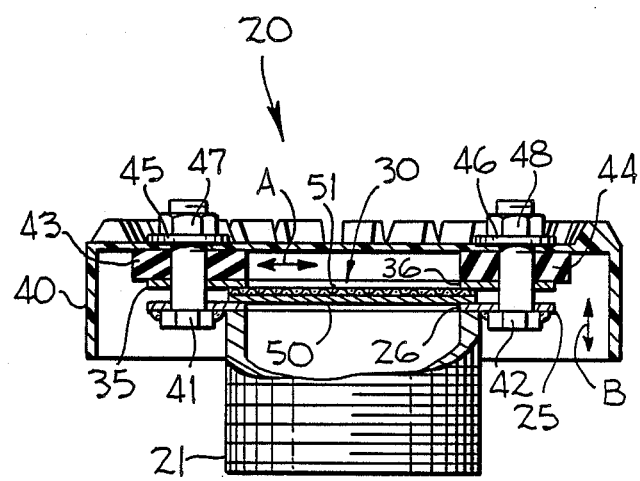
Fig_4A
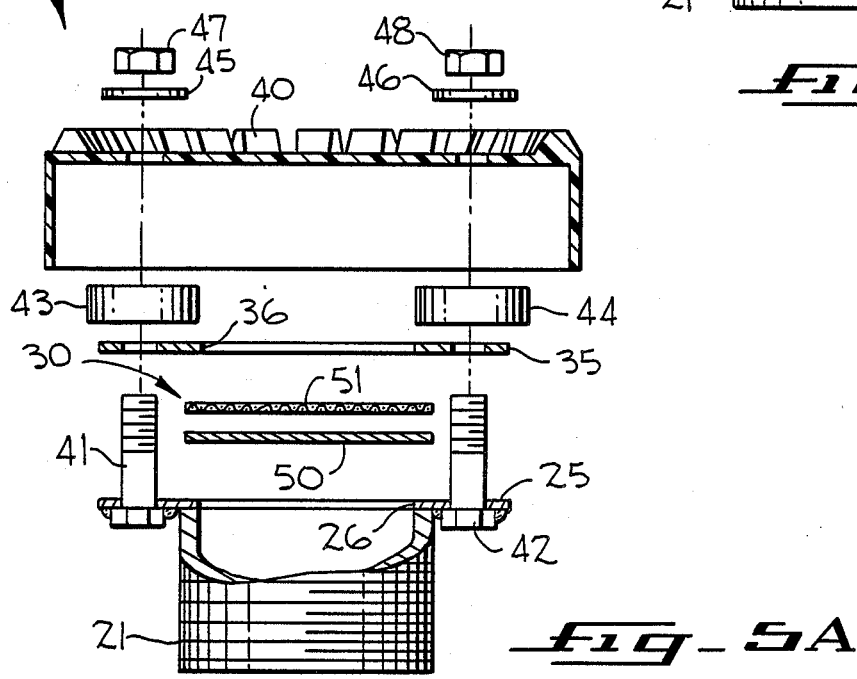
Fig_5A

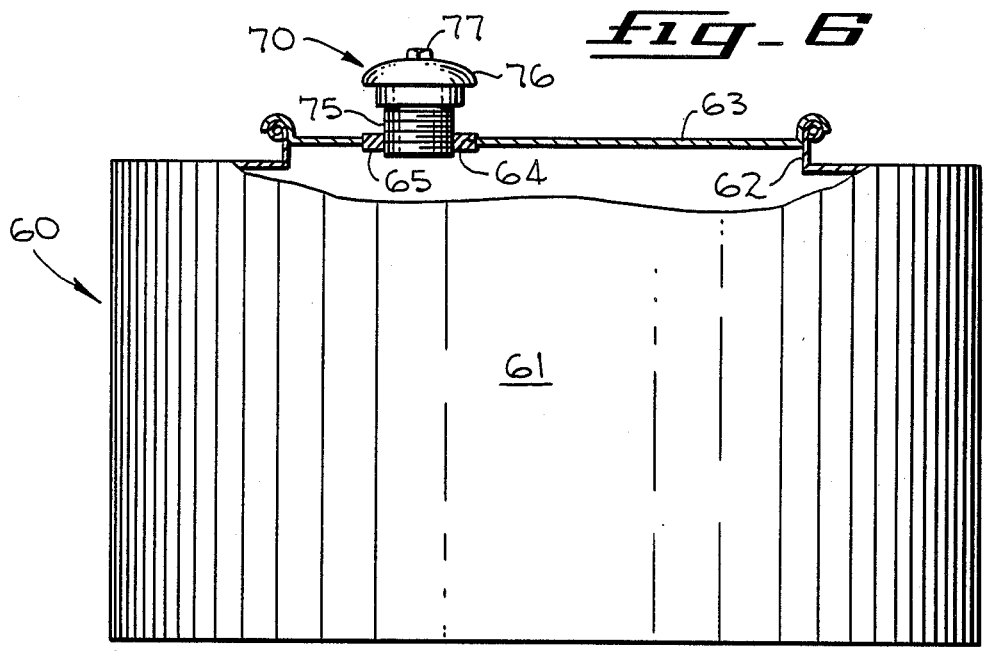
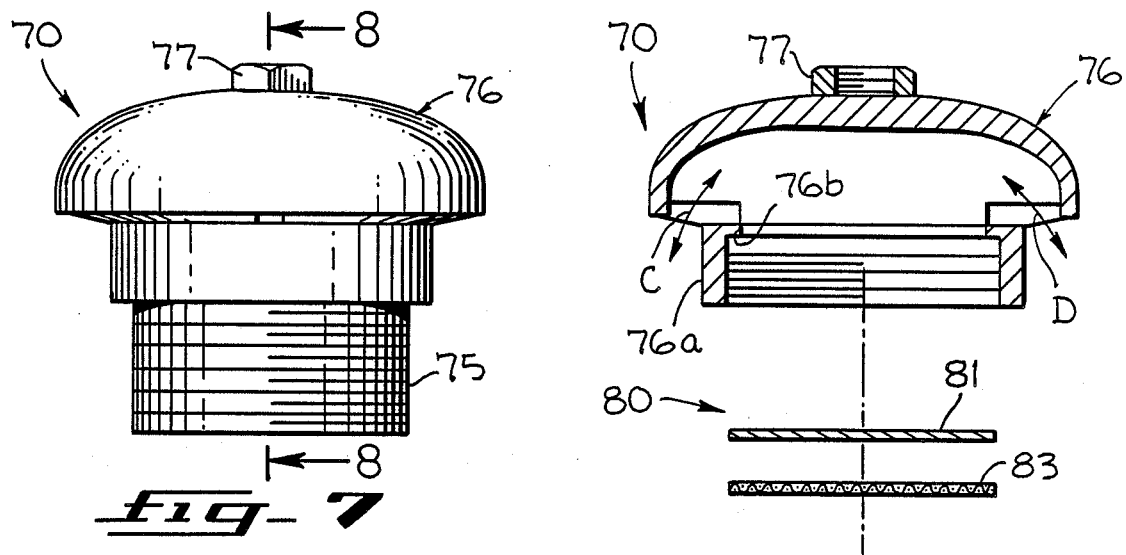
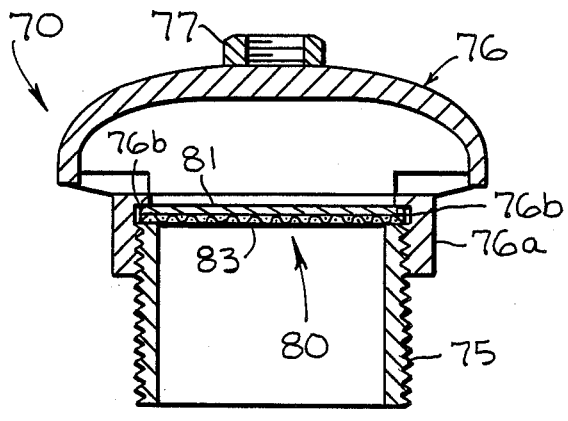
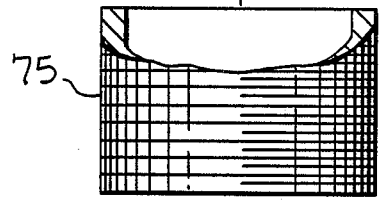

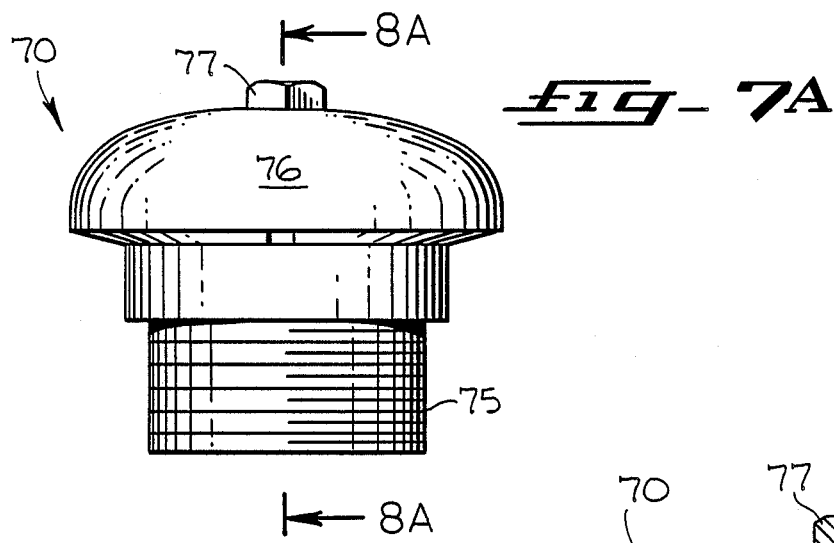
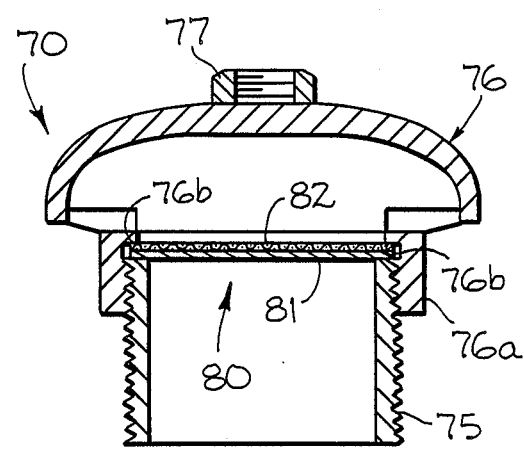
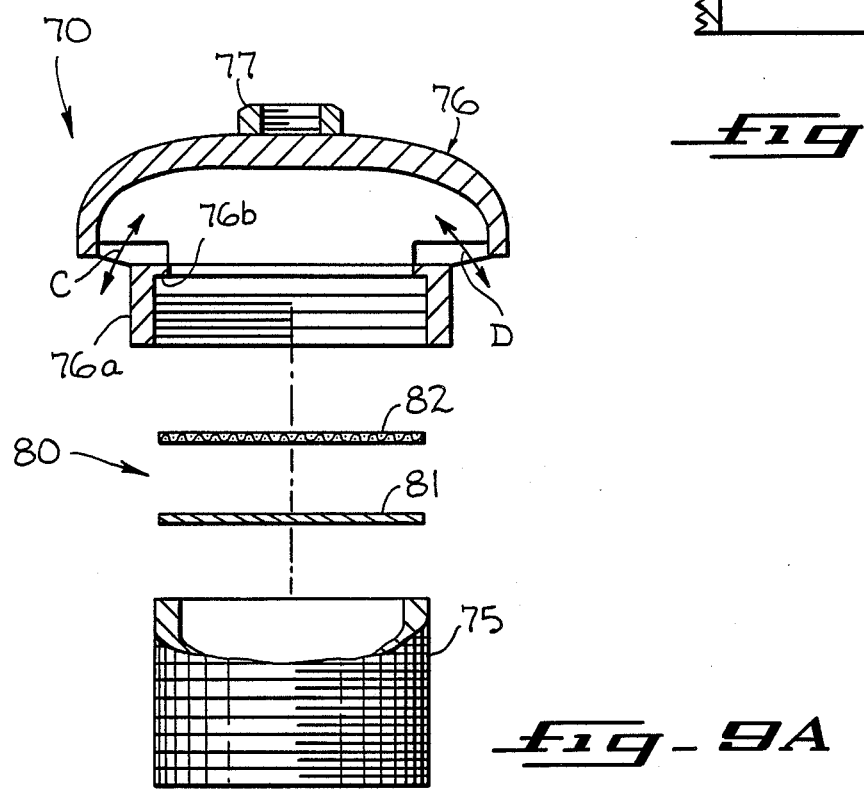

BULK MATERIAL CONTAINER HAVING A FILTER VENT

BACKGROUND OF THE INVENTION

The present invention relates in general to bulk material containers, and more particularly to a bulk material container having a filter vent.

Heretofore storage tanks and containers included filter vents to provide ventilation for permitting fumes to escape and also to prevent foreign matter from obtaining access to the material stored in the tank or container. In such vents, a wire mesh served as the filter. Vents heretofore included a paper filter to permit the entrance or exit of air into or from the container, while restraining the backsplashing of liquid stored in the container through the filter.

Other containers heretofore had vents with a felt filter and screen to provide a breather vent for the material stored in the container. The vent filtered the air entering the container, prevented backsplashing of the material stored in the container and provided breather vent for the intake of air into the container.

In the U.S. Pat. No. 1,921,943, to Rice et al., issued on Aug. 8, 1933, for Screened Vent Cap, there is disclosed a container with a vent pipe. The vent pipe comprises a wire mesh to permit fumes to escape from the container while preventing foreign objects from gaining access to the interior of the container. The U.S. Pat. No. 1,815,920, to Lake, issued on July 28, 1931, for Vent Protector, discloses a container with a vent pipe. The vent pipe comprises a wire mesh screen. The wire mesh screen prevents foreign objects from entering the container, while permitting the container to be in communication with the atmosphere.

The U.S. Pat. No. 2,371,296, to Hopwood, issued on Mar. 13, 1945, for Means For Venting Milk Cans, discloses a container with a vent. The vent comprises a paper filter. The paper filter prevents backsplashing of the material in the container and prevents foreign objects from entering the container. The venting of the container permits the exit of pressure generated in the container and the flow of air into the container to preclude the building up of vacuums in the container.

In the U.S. Pat. No. 1,675,503, to McCallum, issued on July 3, 1928, for Ventilation Attachment For Milk Can Covers, there is disclosed a container with a ventilator. The ventilator comprises a screen of woven wire or perforated sheet metal. The screen provides means for ventilating the container while presenting foreign objects from entering the container. The U.S. Pat. No. 2,603,308, to McCall, issued on July 15, 1952, for Air Filter and Breather For Fluid Fuel Containers, discloses a container with an air filter. The air filter comprises a felt filter and a screen. The air filter serves as a breather and also keeps foreign objects out of the container. Additionally, the air filter prevents backsplashing from the material stored in the container. A central passage is disposed below the air filter.

Heretofore, the filters in breather vents were employed to breathe and to reduce backsplash, but were not employed to protect a bulk material container against rapid increases in vacuum or rapid increases in pressure emanating from the bulk material within the container.

SUMMARY OF THE INVENTION

A bulk material container comprising a vent having a filter through which material within the container breathes. The filter separates during excessive fluid pressure build-up within the container to protect the container against rapid increases in fluid pressure within the container or during excessive vacuum in the container to protect the container from rapid increases in vacuum within the container.

A bulk material container comprising a breather and blow out vent in which a breather and blow out filter includes a membrane. Adjacent the filter is disposed a retainer blow out ring through which fluid under excessive pressure vents rapidly to atmosphere. Fluid under excessive pressure advances through a screen as a preliminary filter and exerts a pressure on the filter membrane to separate or fracture the same and the fluid under excessive pressure is then vented to atmosphere through the retainer blow out ring.

A bulk material container comprises a breather and blow in vent in which a breather and blow in filter includes a membrane. An excessive vacuum within the container causes air under atmospheric pressure to fracture or separate the membrane. Adjacent the filter is disposed a support ring through which air under atmospheric pressure passes rapidly to lessen the degree of vacuum of the bulk material in the container when the membrane is fractured or separated. Air under atmospheric pressure passes rapidly through the filter membrane and through the support ring to lessen the degree of vacuum of the fluid pressure of the bulk material in the container when the membrane is fractured or separated as a result of an excessive vacuum within the container.

A bulk material container comprising a vent in which a filter includes filter material, such as a filter paper. The filter is disposed within a tubular body. During blow out, fluid in the container under excessive fluid pressure is blown out of the container rapidly through the separation or fracture of the filter paper and through the portion of the tubular body above the filter paper. During blow in, an excessive vacuum within the container causes the filter paper to be separated or fractured by air from the atmosphere. Air under atmospheric pressure is discharged into the container instantaneously through the separated or fractured filter paper and through the portion of the tubular body below the filter paper.

An object of the present invention is to provide a filter for a breather vent of a bulk material container that protects the container from rapid increases in fluid pressure that may result from the combustion of the bulk material within the container, or may result from a chemical reaction of the bulk material within the container.

Another object of the present invention is to provide a filter for a breather vent of a bulk material container that protects the container from rapid increases in vacuum when bulk material is rapidly removed from the container.

Another feature of the present invention is the provision of a combined breather and blow out (or blow in) filter for a breather vent. The filter allows minor movements of air in and out of the vent and the container to compensate for gradual buildup of fluid pressure. However, the filter bursts under extreme pressure differentials to protect the container.

DESCRIPTION OF THE DRAWINGS

FIG. 1 is an elevation view of a bulk material container with a vent embodying the present invention.

FIG. 2 is an enlarged elevation view of the vent shown in FIG. 1.

FIG. 3 is a plan view of the vent shown in FIGS. 1 and 2 employed as a blow out vent with a portion of a cover, retainer ring and filter broken away.

FIG. 3A is a plan view of the vent shown in FIGS. 1 and 2 employed as a blow in vent with a portion of the cover, retainer ring and filter broken away.

FIG. 4 is a vertical sectional view of the vent shown in FIGS. 1 and 2 employed as a blow out vent taken along line 4—4 of FIG. 3 with a portion of a pipe broken away.

FIG. 4A is a vertical sectional view of the vent shown in FIGS. 1 and employed as a blow in vent taken along line 4A—4A of FIG. 3A with a portion of a pipe broken away.

FIG. 5 is an exploded vertical sectional view of the vent shown in FIG. 4 employed as a blow out vent taken along line 4—4 of FIG. 3 with a portion of a pipe broken away.

FIG. 5A is an exploded vertical sectional view of the vent shown in FIG. 4A employed as a blow in vent taken along line 4A—4A of FIG. 3A with a portion of the pipe broken away.

FIG. 6 is an elevational view of a bulk material container with a modified vent embodying the present invention with a portion of a shell broken away.

FIG. 7 is an enlarged elevation view of the vent shown in FIG. 6 employed as a blow out vent.

FIG. 7A is an enlarged elevational view of the vent shown in FIG. 6 employed as a blow in vent.

FIG. 8 is a vertical sectional view of the vent shown in FIG. 7 employed as a blow out vent taken along line 8—8 of FIG. 7.

FIG. 8A is a vertical sectional view of the vent shown in FIG. 7A employed as a blow in vent taken along line 8A—8A of FIG. 7A.

FIG. 9 is an exploded vertical sectional view of the vent shown in FIGS. 7 and 8 employed as a blow out vent taken along line 8—8 of FIG. 7 with a portion of a threaded tubular body broken away.

FIG. 9A is an exploded vertical sectional view of the vent shown in FIGS. 7A and 8A employed as a blow in vent taken along line 8A—8A of FIG. 7A with a portion of the threaded tubular body broken away.

DESCRIPTION OF THE PREFERRED EMBODIMENTS

Illustrated in FIG. 1 is a container 10. Formed in the container 10 is a suitable opening 11 through which bulk material is deposited in or removed from a shell 15 of the container 10. A suitable cover 12 is removably secured to the shell 15 of the container 10 over the opening 11 by suitable and well-known means, such as lock ring, not shown. A receptacle 13 is suitably secured to the cover 12.

Removably secured to the cover 12 is a vent 20 (FIGS. 1–5) embodying the present inventions. The vent 20, in the exemplary embodiment, comprises a threaded coupling 21 for threaded engagement with the threaded receptacle 13 to removably secure the vent 20 to the cover 12. Seated on the coupling 21 is a support ring 25 (FIGS. 3–5). The support ring 25 is formed with a central opening 26. Supported by the ring 25 is a filter 30. Above the filter 30 is disposed a retainer ring 35. The retainer ring 35 is formed with a central opening 36. There is communication between the shell 15, the opening of the coupling 21, the opening 26 of the ring 25, the filter 30 and the opening 36 of the ring 35.

Above the retainer ring 36 is disposed a suitable cover 40. In the exemplary embodiment, bolts 41 and 42 are received by suitable aligned openings in the support ring 25, the retainer ring 35 and the cover 40. The bolts 41 and 42 are attached to the support ring 25. Suitable spacers, such as rubber spacers 43 and 44, are received by the bolts 41 and 42, respectively, and are disposed between the underside of the cover 40 and the retainer ring 35. Suitable washers 45 and 46 are disposed between the cover 40 and nuts 47 and 48, respectively. The nuts 47 and 48 secure as an assembled arrangement the cover 40, the spacers 43 and 44, the retainer ring 35 the filter 30 and the support ring 25. The opening 36 of the retainer disc 35 communicates with the atmosphere via the space within the cover 40 set up by the spacers 43 and 44 and the open underside of the cover 40 as more clearly illustrated by the arrows A and B in FIG. 4.

In the employment of the vent 20 as a breather vent and a blow out vent (or a blow in vent), the filter 30 comprises suitable filter paper 50, preferably filter paper known as Whatman paper (Fast 114 or Medium Fast 111) wet strengthened manufactured by Whatman Limited of England. The filter paper 50 can be any suitable filter paper that will breathe under normal operating conditions and will separate or fracture at a fluid pressure in excess of a preselected fluid pressure or will separate or fracture at a vacuum greater than a preselected vacuum.

In normal operation, the breathing through the filter paper 50 is at a nominal temperature build-up. In normal operation, the vacuum is at the vacuum normally created by the normal pump out rate of the fluid in the shell 15. When the fluid pressure or the vacuum is excessive, there is a danger of a pressure explosion or vacuum collapse. To prevent the pressure explosion or the vacuum collapse, the filter paper 50 is selected to separate or fracture when the fluid pressure is in excess of the preselected fluid pressure or when the vacuum is greater than the preselected vacuum. An excessive fluid pressure may occur when the shell 15 is in the presence of excessive temperature or a chemical reaction whereby the bulk material produces large volumes of gas. An excessive vacuum may occur when fluid is pumped out of the shell 15 at an excessively rapid rate.

The filter paper 50 is disposed either adjacent wire mesh screen 51 or wire mesh screen 52 dependant on whether the vent 20 is employed as a blow in vent (FIGS. 4A and 5A) or as a blow out vent (FIGS. 4 and 5). In the preferred embodiment, the screens 51 and 52 are made of stainless steel wire fabric of 30×30 mesh and 0.013 wire. Should the screens be made of brass wire fabric, then the mesh is 3033 30 and the wire is 0.012, in the preferred embodiment.

In the operation of the vent 20 as a breather vent, the retainer ring 35 serves as a breather ring. The bulk material within the shell 15 breathes with the air under atmospheric pressure through the filter paper 50 and the breather retainer ring 35. Through the breather vent, entrapped air in the shell 15 is vented to atmosphere.

In the employment of the vent 20 as a blow out vent, the filter 30 comprises the suitable membrane 50 disposed above the wire mesh screen 52 (FIGS. 3–5. In the operation of the vent 20 as a blow out vent, fluid under excessive pressure in the shell 15 passes through the wire mesh screen 52 as a preliminary filter and exerts an excessive pressure on the filter membrane 50 which is sufficient to stretch the filter membrane 50 and thereby separate or fracture the same. The fluid under excessive pressure is vented rapidly to atmosphere through the separated filter membrane 50, blow out retainer ring 35 and the opening 36.

In the employment of the vent 20 as a blow in vent, the filter 30 comprises the suitable membrane 50 disposed below the wire mesh screen 51 (FIGS. 3A-5A). In the operation of the vent 20 as a blow in vent, the fluid under pressure in the shell 15 has a fluid pressure excessively less than atmospheric pressure. Air under atmospheric pressure passes through the retainer ring 35, opening 36 and the wire mesh screen 51 as a preliminary filter. The air under atmospheric pressure rapidly exerts a pressure on the filter membrane 50 to stretch the filter membrane 50 and thereby separate or fracture the same. The air under atmospheric pressure passes rapidly through the separated membrane 50, blow in support ring 25 and the opening 26 to lessen the degree of vacuum of the fluid pressure of the material in the shell 15.

When the vent 20 is employed as a blow out relief vent (FIGS. 314 5), the fluid within the shell 15 under excessive pressure is vented through the opening 26, screen 52 as a preliminary filter, filter membrane the central opening 36 to atmosphere. The edges of the filter membrane 50 are held in place by the retainer ring 35. When the fluid pressure in the shell 15 exceeds the preselected pressure for the separating or fracturing of the filter membrane 50, the filter membrane 50 stretches for separating or fracturing and thereby allows the fluid under excessive pressure within the shell 15 to vent to atmosphere.

When the vent 20 is employed as a blow in relief vent (FIGS. 3A-5A), there is an excessive vacuum within the shell 15. As a consequence thereof, air from the atmosphere passes through the central opening 36 and the screen 51 as a preliminary filter. Thereupon, the air under atmospheric pressure applies a pressure against the filter membrane 50 to stretch the same until separated or fractured. The air under atmospheric pressure thereupon enters the shell 15 through the support ring 25 and the opening 26.

Illustrated in FIG. 6 is a bulk material container 60. The bulk material container 60 comprises a shell 61 formed with a suitable opening or a manhole 62. Detachably secured to the shell 61 over the opening 62 is a suitable cover or a manhole cover 63. Formed in the cover 63 is a vent opening 64. In the exemplary embodiment, disposed in the vent opening 64 is an internally threaded tubular receptacle 65 that is welded to the cover 63. Disposed in threaded engagement with the tubular receptacle 65 is a filter breather and blow out (or blow in) vent 70 embodying the present invention.

The filter breather and blow out (or blow in) vent 70 comprises, in the exemplary embodiment, an externally threaded tubular body 75. The lower end of the tubular body 75 is disposed in threaded engagement with the tubular receptacle 65. The upper end of the tubular body 75 is disposed in threaded engagement with the internal threads of a depending tubular body 76a (FIGS. 8, 8A, 9 and 9A) of a suitable cover, such as a hollowed, mushroom-shaped cover 76. A nut 77 is welded to the top of the cap 76 to facilitate wrench tightening of the vent 70 breather and blow out (or blow in).

Seated within the tubular body 76a is a filter 80. The filter 80, in the preferred embodiment, comprises filter material 81 disposed either adjacent wire mesh screen 82 or wire mesh screen 83 dependent on whether the vent 70 is employed as a blow in vent (FIGS. 8A and 9A) or whether the vent 70 is employed as a blow out vent (FIGS. 8 and 9). The wire mesh screens 82 and 83, in the exemplary embodiment, are made of brass with 3033 30 mesh and with 0.012 wire. The filter 80 is urged against a shoulder 76b of the tubular body 76a by the tubular body 75 and is supported by the facing end of the tubular body 75 being in threaded engagement with the tubular body 76a of the cover 76.

The shell 61 communicates with atmosphere through the tubular body 75, the tubular body 76a of the cover 76, and the hollow portion of the cover 76. The hollow cover 76 communicates with the atmosphere through the underside thereof as more clearly shown by the arrows C and D in FIG. 9.

In the employment of the vent 70 as a breather and blow out vent (FIGS. 8 and 9), the filter 80 comprises a suitable well-known filter paper 81. The filter paper 81 is similar in construction and function to the filter paper 50 heretofore described in detail. The filter paper 81 is disposed adjacent the wire mesh screen 83. In the operation of the vent 70 as a breather vent, the upper portion of the body 76a of the cover 76 above the filter 80 serves as a breather ring. The bulk material within the shell 15 breathes with the air under atmospheric pressure through the filter 80 and the upper portion of breather retainer section 76a. Through the breather vent, the bulk material in the shell 61 breathes with the air under atmospheric pressure and air entrapped in the shell 61 is vented to atmosphere.

In the employment of the vent 70 as a blow out vent (FIGS. 8 and 9), the filter 80 comprises the suitable membrane 81 disposed above the wire mesh screen 83. In the operation of the vent 70 as a blow out vent, fluid under excessive pressure in the shell 61 passes through the wire mesh screen 83 as a preliminary filter and exerts a pressure on the filter membrane 81. Excessive pressure on the filter membrane 81 is sufficient to stretch the filter membrane 81 and thereby separate or fracture the same. The fluid under excessive pressure is then rapidly vented to atmosphere through the separated filter membrane 81 and upper portion of blow out retainer section 76a.

In the employment of the vent as a blow in vent (FIGS. 8A and 9A), the filter 80 comprises the suitable membrane 81 disposed below the wire mesh screen 82. In the operation of the vent 70 as a blow in vent, the vacuum in the shell 61 is excessive. Air under atmospheric pressure passes through the hollow portion of the cover 76, the upper portion of the tubular body 76a of the cover 76, and the wire mesh screen 82 as a preliminary filter. The air under atmospheric pressure exerts a pressure on the filter membrane 81 to stretch the filter membrane 81 and thereby separate or fracture the same when the vacuum in the shell 61 is excessive. Air under atmospheric pressure then passes rapidly through the separated filter membrane 81 and a blow in tubular body 75 to lessen the degree of vacuum in the shell 61. The blow in tubular body 75 is below the filter 80.

What is claimed is:

1. A bulk material container comprising:

(a) a shell for storing fluid material, said shell being formed with an opening disposed in a path communicating with air under atmospheric pressure and along which fluid material stored in said shell travels; and (b) a vent disposed along said path and comprising a filter for fluid material stored in said shell to breathe with air under atmospheric pressure and for separating in response to fluid material disposed in said shell under fluid pressure in excess of a predetermined pressure, whereby fluid material in said shell under excessive fluid pressure vents to atmosphere through said separated filter.

2. A bulk material container as claimed in claim 1 wherein said filter comprises a filter membrane through which fluid material stored in said shell breathes with air under atmospheric pressure and for separating in response to fluid material in said shell exceeding a predetermined pressure for venting fluid material in said shell under excessive pressure to atmosphere through said separated membrane.

3. A bulk material container as claimed in claim 2 and comprising a filter screen disposed adjacent said filter membrane.

4. A bulk material container as claimed in claim 3 wherein said screen is disposed below said filter membrane, said bulk material container comprising a retainer ring disposed above said filter membrane, said retainer ring being a breather ring for fluid material stored in said shell to advance therethrough for breathing with air under atmospheric pressure and a blow out ring for fluid material in said shell under excessive fluid pressure to vent to atmosphere.

5. A bulk material container comprising:

(a) a shell for storing fluid material, said shell being formed with an opening disposed in a path communicating with wire under atmospheric pressure and along which fluid material stored in said shell travels; and (b) a vent disposed along said path and comprising a filter for fluid material stored in said shell to breathe with air under atmospheric pressure and for separating upon the application of air under atmospheric pressure when a vacuum in said shell exceeds a predetermined vacuum, whereby air under atmospheric pressure enters said shell through said separated filter for reducing the vacuum in said shell.

6. A bulk material container as claimed in claim 5 wherein said filter comprises a filter membrane through which fluid material stored in said shell breathes with air under atmospheric pressure and for separating in response to the application of air under atmospheric pressure when a vacuum in said shell exceeds a predetermined vacuum for air under atmospheric pressure to enter said shell rapidly through said separated membrane for reducing the vacuum in said shell.

7. A bulk material container as claimed in claim 6 and comprising a filter screen disposed adjacent said filter membrane.

8. A bulk material container as claimed in claim 7 wherein said screen is disposed above said filter membrane, said bulk material container comprising a retainer ring disposed above said screen, said retainer ring being a breather ring for fluid material stored in said shell to advance therethrough for breathing with air under atmospheric pressure.

9. A bulk material container as claimed in claim 8 and comprising a support ring disposed below said filter membrane, said support ring being a blow in ring for air under atmospheric pressure to enter said shell when a vacuum in shell exceeds a predetermined vacuum for air under atmospheric pressure to enter said shell rapidly for reducing the vacuum in said shell.

10. A filter vent for a bulk material container comprising:

(a) a tubular body with an opening therethrough defining a path along which air under atmospheric pressure travels from one end of said path and fluid material under pressure travels from another end of said path, and (b) a filter disposed in said body intermediate the ends of said path, said filter being constructed for fluid material under pressure to breathe with air under atmospheric pressure travelling from said one end of said path and for separating in response to fluid material under fluid pressure in excess of a predetermined pressure travelling from said other end of said path for the fluid material under excessive pressure to vent to atmosphere by way of said one end of said path.

11. A filter vent as claimed in claim 10 wherein said filter comprises a filter membrane through which fluid material breathes with air under atmospheric pressure and for separating in response to fluid material exceeding a predetermined pressure for venting fluid material under excessive fluid pressure to atmosphere through said separated membrane.

12. A filter vent as claimed in claim 11 and comprising a filter screen disposed adjacent said filter membrane.

13. A filter vent as claimed in claim 12 wherein said screen is disposed below said filter membrane, said filter vent comprising a retainer ring disposed above said filter membrane, said retainer ring being a breather ring for fluid material to advance therethrough for breathing with air under atmospheric pressure and a blow out ring for fluid material under excessive fluid pressure to vent to atmosphere.

14. A filter vent for a bulk material container comprising:

(a) a tubular body with an opening therethrough defining a path along which air under atmospheric pressure travels from on end of said path and fluid material under pressure travels from another end of said path, and (b) a filter disposed in said body intermediate the ends of said path, said filter being constructed for fluid material under pressure to breathe with air under atmospheric pressure travelling from said one end of said path and for separating upon the application of air under pressure from said one end of said path when a vacuum is present at said other end of said path exceeding a predetermined vacuum in order for air under atmospheric pressure from said one end of said path to advance rapidly through said separated membrane and discharge from said other end of said path for reducing the vacuum.

15. A filter vent as claimed in claim 14 wherein said filter comprises a filter membrane through which fluid material breathes with air under atmospheric pressure and for separating upon the application of air under pressure and said one end of said path when a vacuum is present at said other end of said path exceeding a predetermined vacuum in order for air under atmospheric pressure from said one end of said path to advance rapidly through said separated membrane and discharge from said other end of said path for reducing the vacuum.

16. A filter vent as claimed in claim 15 and comprising a filter screen disposed adjacent said filter membrane.

17. A filter vent as claimed in claim 16 wherein said screen is disposed above said filter membrane, said filter vent comprising a retainer ring disposed above said screen, said retainer ring being a breather ring for fluid material to advance therethrough for breathing with air under atmospheric pressure.

18. A filter vent as claimed in claim 16 and comprising a support ring disposed below said filter membrane, said support ring being a blow in ring for air under atmospheric pressure to discharge from said other end of said path when a vacuum at said other end of said path exceeds a predetermined vacuum for air under atmospheric pressure to advance rapidly through said filter membrane for reducing the vacuum at said other end of said path.

* * * * *

UNITED STATES PATENT AND TRADEMARK OFFICE
CERTIFICATE OF CORRECTION

PATENT NO. : 4,793,509
DATED : December 27, 1988
INVENTOR(S) : Clarence B. Coleman It is certified that error appears in the above-identified patent and that said Letters Patent is hereby corrected as shown below:

Claim 14, line 18, change "membrane" to --filter--.

Signed and Sealed this

Second Day of May, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,793,509

DATED : December 27, 1988

INVENTOR(S) : CLARENCE B. COLEMAN

It is certified that error appears in the above-identified patent and that said Letters Patent is hereby corrected as shown below:

Col. 7, claim 5, line 4, change "wire" to --air--.

Signed and Sealed this

Seventeenth Day of November, 1992

Attest:

DOUGLAS B. COMER

*Attesting Officer*   *Acting Commissioner of Patents and Trademarks*